(12) United States Patent
Pendharkar

(10) Patent No.: US 9,524,190 B1
(45) Date of Patent: Dec. 20, 2016

(54) SYSTEMS AND METHODS FOR CACHING DATA ON VIRTUALIZATION SERVERS

(75) Inventor: Niranjan Pendharkar, Pune (IN)

(73) Assignee: Veritas Technologies, LLC, Mountain View, CA (US)

( * ) Notice: Subject to any disclaimer, the term of this patent is extended or adjusted under 35 U.S.C. 154(b) by 258 days.

(21) Appl. No.: 13/607,434

(22) Filed: Sep. 7, 2012

(51) Int. Cl.
*G06F 9/48* (2006.01)

(52) U.S. Cl.
CPC .................... *G06F 9/4856* (2013.01)

(58) Field of Classification Search
CPC ............... G06F 9/45533; G06F 2009/4557; G06F 2201/815; G06F 2009/45562; G06F 2009/45587; G06F 2009/45595; G06F 9/4856; G06F 9/5077; G06F 21/53; G06F 2009/45575
See application file for complete search history.

(56) References Cited

U.S. PATENT DOCUMENTS

| | | | |
|---|---|---|---|
| 7,831,977 B2* | 11/2010 | Shultz ...................... | G06F 9/526 709/203 |
| 8,527,990 B1* | 9/2013 | Marathe et al. .................. | 718/1 |
| 8,805,951 B1* | 8/2014 | Faibish ................. | G06F 9/5072 709/213 |
| 2010/0023582 A1* | 1/2010 | Pedersen et al. ............. | 709/203 |
| 2010/0299673 A1* | 11/2010 | Shultz et al. ................. | 718/104 |
| 2011/0029970 A1* | 2/2011 | Arasaratnam ....... | G06F 9/45558 718/1 |
| 2011/0197022 A1* | 8/2011 | Green et al. .................. | 711/112 |
| 2012/0089775 A1* | 4/2012 | Ranade et al. ................ | 711/113 |
| 2012/0210066 A1* | 8/2012 | Joshi .................... | G06F 12/0866 711/118 |

* cited by examiner

*Primary Examiner* — David X Yi
*Assistant Examiner* — Tahilba Puche
(74) *Attorney, Agent, or Firm* — Fisherbroyles LLC

(57) ABSTRACT

A computer-implemented method for caching data on virtualization servers may include: 1) providing a virtualization server that executes at least one virtual machine on the virtualization server, 2) intercepting a data operation that includes both basic data and metadata, the data operation being requested by the virtualization server, 3) caching the basic data from the data operation on a solid state drive cache at the virtualization server, and 4) preventing the solid state drive cache from providing metadata from the data operation to the virtualization server. Various other methods, systems, and computer-readable media are also disclosed.

20 Claims, 8 Drawing Sheets

SYSTEMS AND METHODS FOR CACHING DATA ON VIRTUALIZATION SERVERS

BACKGROUND

Persons and businesses may desire to isolate various computing systems without using additional hardware. In these situations virtual machines may be useful. A cluster virtualization system may contain multiple hosts, or virtualization servers, that execute one or more virtual machines. The virtualization system may use a virtual machine file system that references metadata. The metadata may map data to a target virtual machine. Multiple hosts in the cluster virtualization system may share a metadata storage system, but may fail to share application data or data other than metadata.

Writing data to a data storage shared by multiple virtualization servers may take a relatively long time. Accordingly, it may be desirable to cache at least some of the data at the virtualization server instead of at the shared data storage. Unfortunately, caching metadata at a virtualization server may create inconsistencies, because the multiple virtualization servers may share metadata even if they do not share application data or data other than metadata.

SUMMARY

As will be described in greater detail below, the instant disclosure generally relates to systems and methods for caching data on virtualization servers.

In one example, a computer-implemented method for caching data on virtualization servers may include 1) providing a virtualization server that executes at least one virtual machine on the virtualization server, 2) intercepting a data operation that includes both basic data and metadata, the data operation being requested by the virtualization server, 3) caching the basic data from the data operation on a solid state drive cache at the virtualization server, and 4) preventing the solid state drive cache from providing metadata from the data operation to the virtualization server.

In some examples, intercepting the data operation may include intercepting the data operation by a dynamic multipathing module in a virtualization system that contains the virtualization server.

In some embodiments, preventing the solid state drive cache from providing metadata may include filtering metadata from the data operation such that only basic data is cached on the solid state drive cache. In other embodiments, preventing the solid state drive cache from providing metadata may also include caching the metadata on the solid state drive cache and invalidating at least a part of the solid state drive cache in response to caching the metadata. In some embodiments, invalidating the part of the cache may include invalidating the entire solid state drive cache. In other embodiments, invalidating the part of the cache may include invalidating a part of the solid state drive cache that contains the metadata without invalidating a part of the solid state drive cache that contains the basic data.

In some examples, the method may also include determining whether an operation to filter metadata from the data operation is available. In these examples, the method may further include performing at least one of the following: filtering metadata from the data operation in response to determining that an operation to filter metadata is available and/or invalidating at least part of the solid state drive cache in response to determining that an operation to filter metadata is not available.

In some examples, preventing the solid state drive cache from providing metadata may include distinguishing between the basic data and the metadata in the data operation. In some embodiments, distinguishing between the basic data and the metadata in the data operation may include identifying data blocks that are accessed during a lock on a shared metadata storage and designating the identified data blocks as metadata. In the same or different embodiments, distinguishing between the basic data and the metadata in the data operation may also include identifying at least one I/O operation that is not marked with a virtual machine tag and designating data blocks within the identified I/O operation as metadata.

In some examples, the method may further include attempting to migrate the virtual machine from the virtualization server to another virtualization server within a virtualization system. In some embodiments, the method may further include clearing the entire solid state drive cache in response to the attempt to migrate the virtual machine. In other embodiments, the method may also include identifying data blocks on the solid state drive cache belonging to the virtual machine, and clearing only the identified data blocks belonging to the virtual machine without clearing other data blocks on the solid state drive cache that belong to another virtual machine. Identifying the data blocks and clearing the data blocks may be performed by a dynamic multipathing module in the virtualization system.

In some examples, the method may also include determining whether the virtualization server was configured to perform write-back caching or write-through caching. Write-back caching may return success of a data operation after performing the data operation on the solid state device cache first and then only perform the data operation on a shared metadata storage after a delay. Write-through caching may return success of a data operation after performing the data operation in parallel on both the solid state drive cache and a primary storage device.

In these examples, the method may include determining that the virtualization server was configured to perform write-back caching. In such embodiments, the method may further include performing, in response to the attempt to migrate the virtual machine, at least one pending data operation that is cached on the solid state drive cache on the shared metadata storage. In these examples, the method may also include clearing the solid state drive cache only after performing the pending data operation on the metadata storage.

In one embodiment, a system for implementing the above-described method may include 1) a provisioning module programmed to provide a virtualization server that executes at least one virtual machine on the virtualization server, 2) an interception module programmed to intercept a data operation that includes both basic data and metadata, the data operation being requested by the virtualization server, 3) a caching module programmed to cache the basic data from the data operation on a solid state drive cache at the virtualization server, 4) a prevention module programmed to prevent the solid state drive cache from providing metadata from the data operation to the virtualization server, and 5) at least one processor configured to execute the provisioning module, the interception module, the caching module, and the prevention module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) provide a virtualization server that executes at least one virtual machine on the virtualization server, 2) intercept a data operation that includes both basic data and metadata, the data operation being requested by the virtualization server, 3) cache the basic data from the data operation on a solid state drive cache at the virtualization server, and 4) prevent the solid state drive cache from providing metadata from the data operation to the virtualization server.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
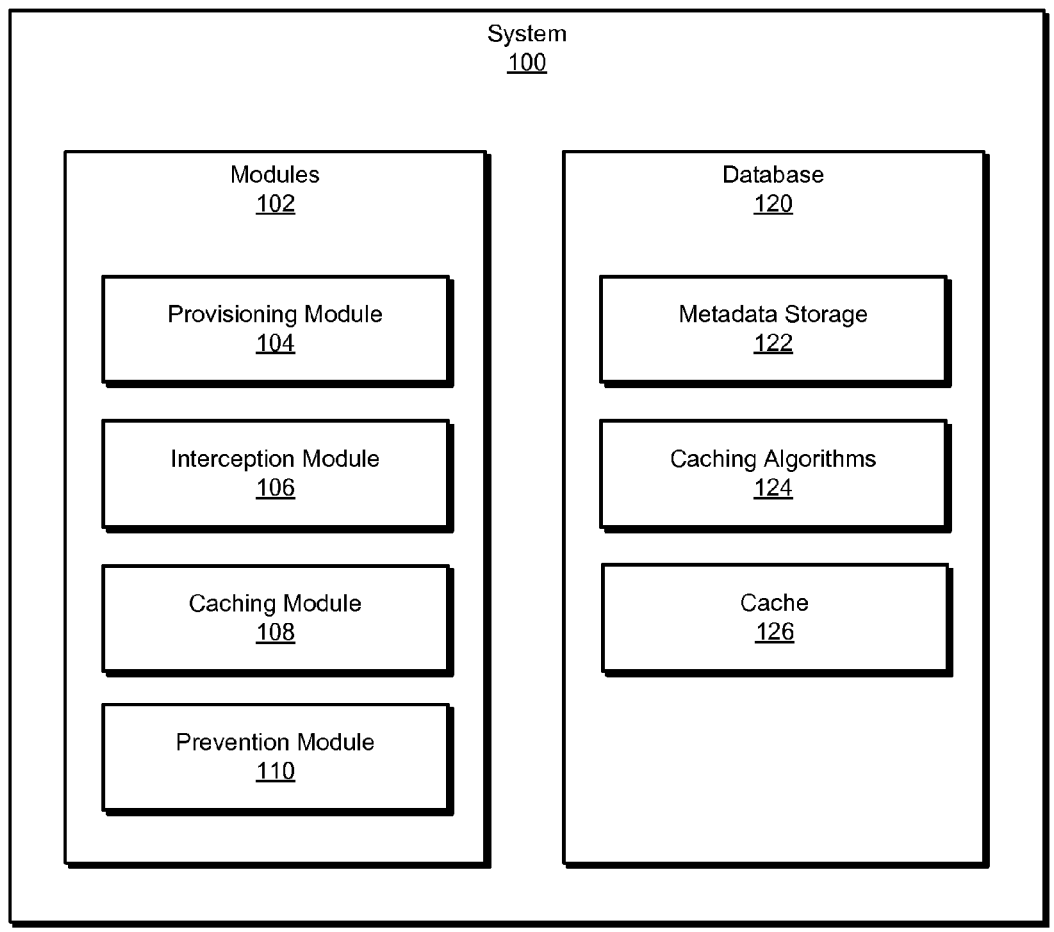
FIG. 1 is a block diagram of an exemplary system for caching data on virtualization servers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for caching data on virtualization servers. As will be explained in greater detail below, the systems and methods described herein may enable virtualization servers to cache data without creating conflicts over a shared metadata storage system. By implementing a solid state drive cache, one can reduce input/output operations over a storage network used by the virtualization system. Reducing input/output operations also enables more virtual machines to be executed on the same host.

Figure 2:
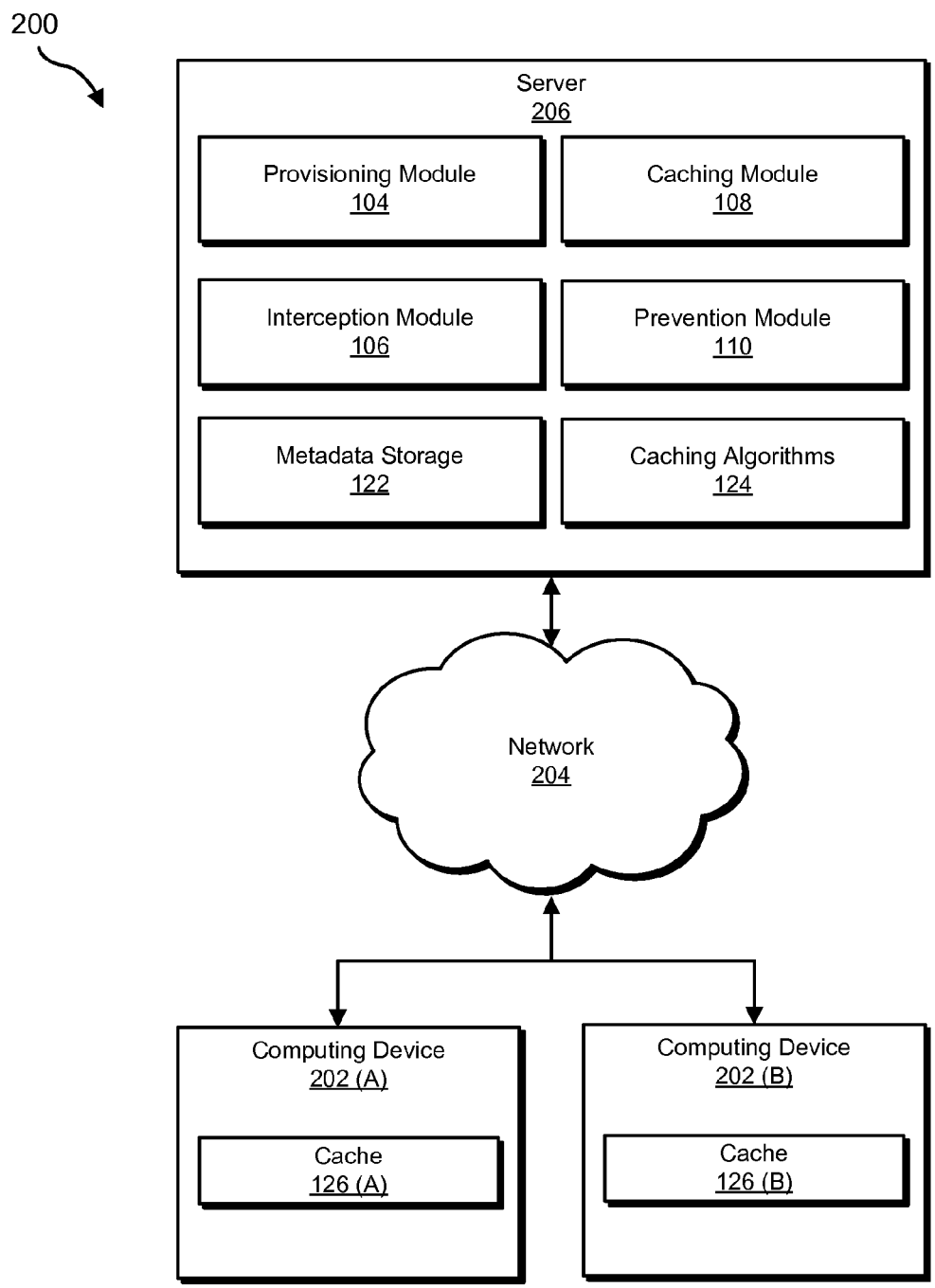
FIG. 2 is a block diagram of an exemplary system for caching data on virtualization servers.

The following will provide, with reference to FIGS. 1-2, detailed descriptions of exemplary systems for caching data on virtualization servers. Detailed descriptions of corresponding computer-implemented methods will also be provided in connection with FIG. 3. Detailed descriptions of a solid state drive cache will be provided in connection with FIGS. 4 and 6. A detailed description of locking and releasing shared metadata storage will also be provided in connection with FIG. 5. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for caching data on virtualization servers. As illustrated in this figure, exemplary system 100 may include one or more modules 102 for performing one or more tasks. For example, and as will be explained in greater detail below, exemplary system 100 may include a provisioning module 104 programmed to provide a virtualization server that executes at least one virtual machine on the virtualization server. Exemplary system 100 may also include an interception module 106 programmed to intercept a data operation that includes both basic data and metadata, the data operation being requested by the virtualization server.

In addition, and as will be described in greater detail below, exemplary system 100 may include a caching module 108 programmed to cache the basic data from the data operation on a solid state drive cache at the virtualization server. System 100 may also include a prevention module 110 programmed to prevent the solid state drive cache from providing metadata from the data operation to the virtualization server. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 (A) or (B) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store metadata storage 122. Metadata storage 122 may store virtual machine metadata that maps data to a target virtual machine. Database 120 may also be configured to store caching algorithms 124. Caching algorithms 124 may include various algorithms for caching data on a solid state drive cache, such as solid state drive cache 126.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG.

Figure 7:
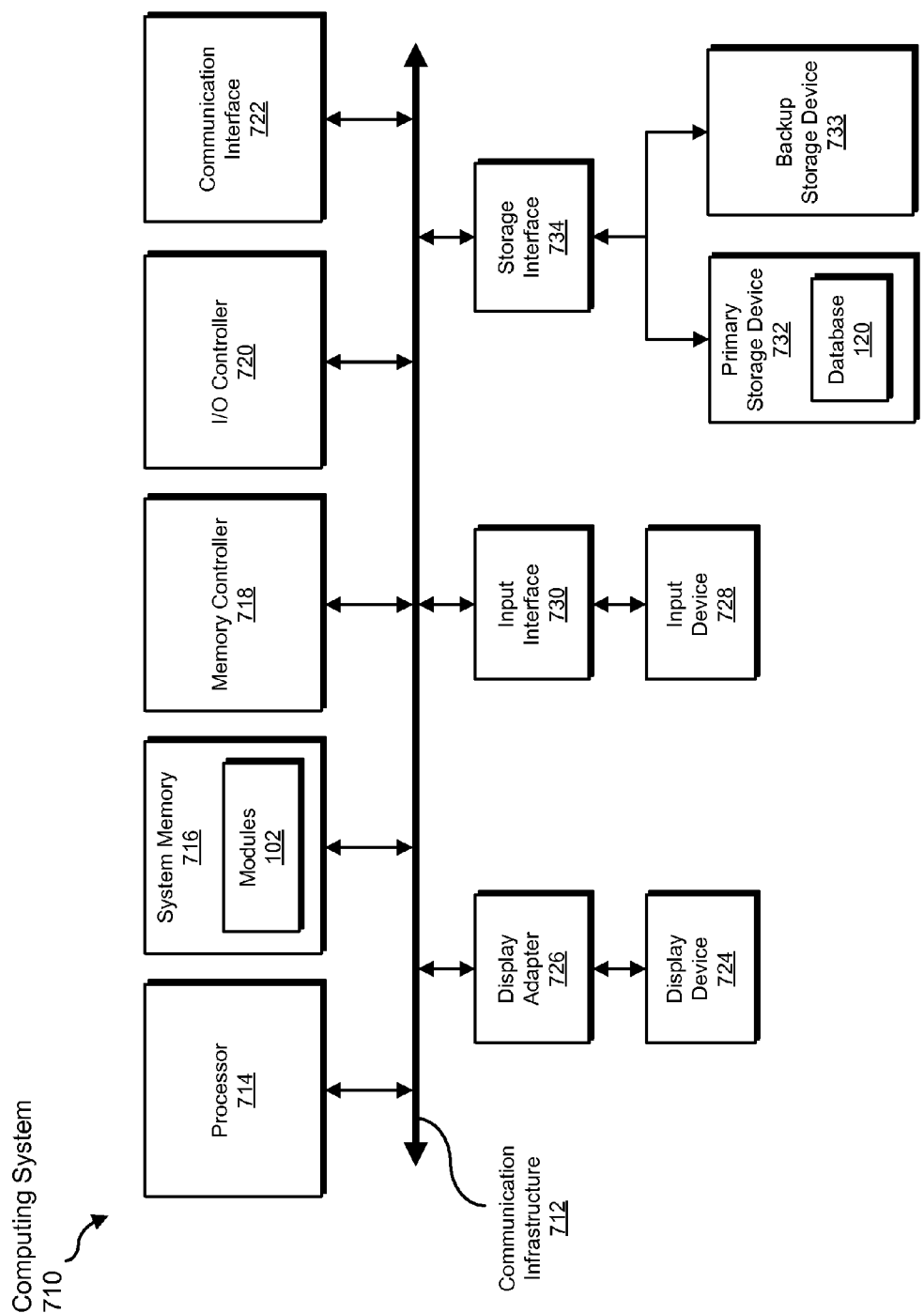
FIG. 7 is a block diagram of an exemplary computing system capable of implementing one or more of the embodiments described and/or illustrated herein.
Figure 8:
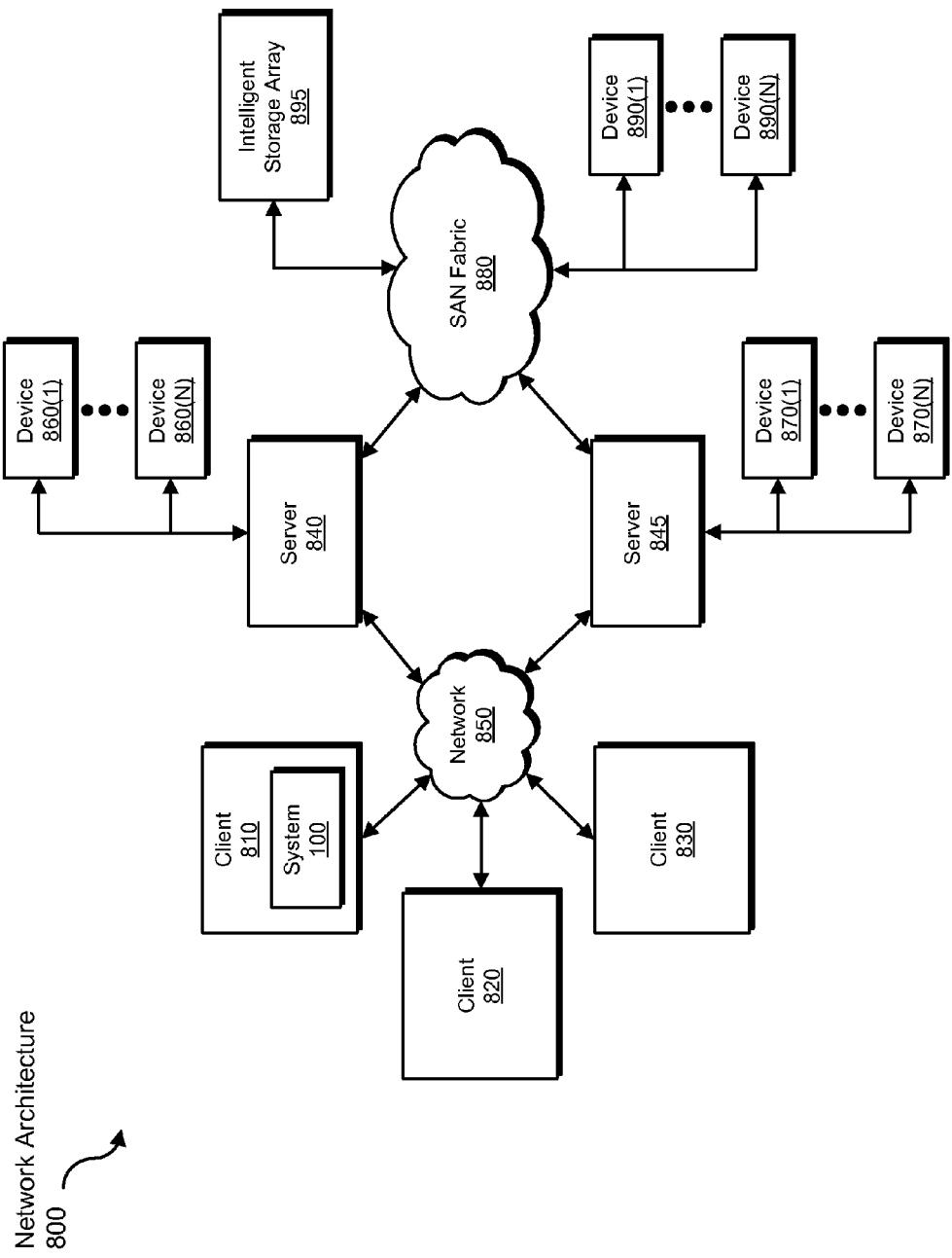
FIG. 8 is a block diagram of an exemplary computing network capable of implementing one or more of the embodiments described and/or illustrated herein.

2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202 (A) and (B) in communication with a server 206 via a network 204. Computing device 202 (A) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 (A) and/or server 206, facilitate computing device 202 (A) and/or server 206 in caching data on virtualization servers. For example, and as will be described in greater detail below, one or more of modules 102 may cause computing device 202 (A) and/or server 206 to 1) provide a virtualization server that executes at least one virtual machine on the virtualization server; 2) intercept a data operation that includes both basic data and metadata, the data operation being requested by the virtualization server; 3) cache the basic data from the data operation on a solid state drive cache at the virtualization server; and 4) prevent the solid state drive cache from providing metadata from the data operation to the virtualization server.

Computing devices 202 (A) and (B) generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of managing virtualization servers. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing devices 202 (A) and (B) and server 206.

In the example of FIG. 2, server 206 may include a centralized server that manages virtualization servers implemented in computing devices 202 (A) and (B). Each of the computing devices 202 (A) and (B) may correspond to a host in a cluster virtualization system. For example, server 206 may manage the migration of a virtual machine from computing device 202 (A) to computing device 202 (B). As shown in FIG. 2, each of the computing devices 202 (A) and (B) may include a separate solid state drive cache 126 (A) or (B). Also, while FIG. 2 shows modules 104-110 as part of server 206, the functionality of one or more of modules 104-110 could be implemented within computing devices 202(A) and/or (B).

Figure 3:
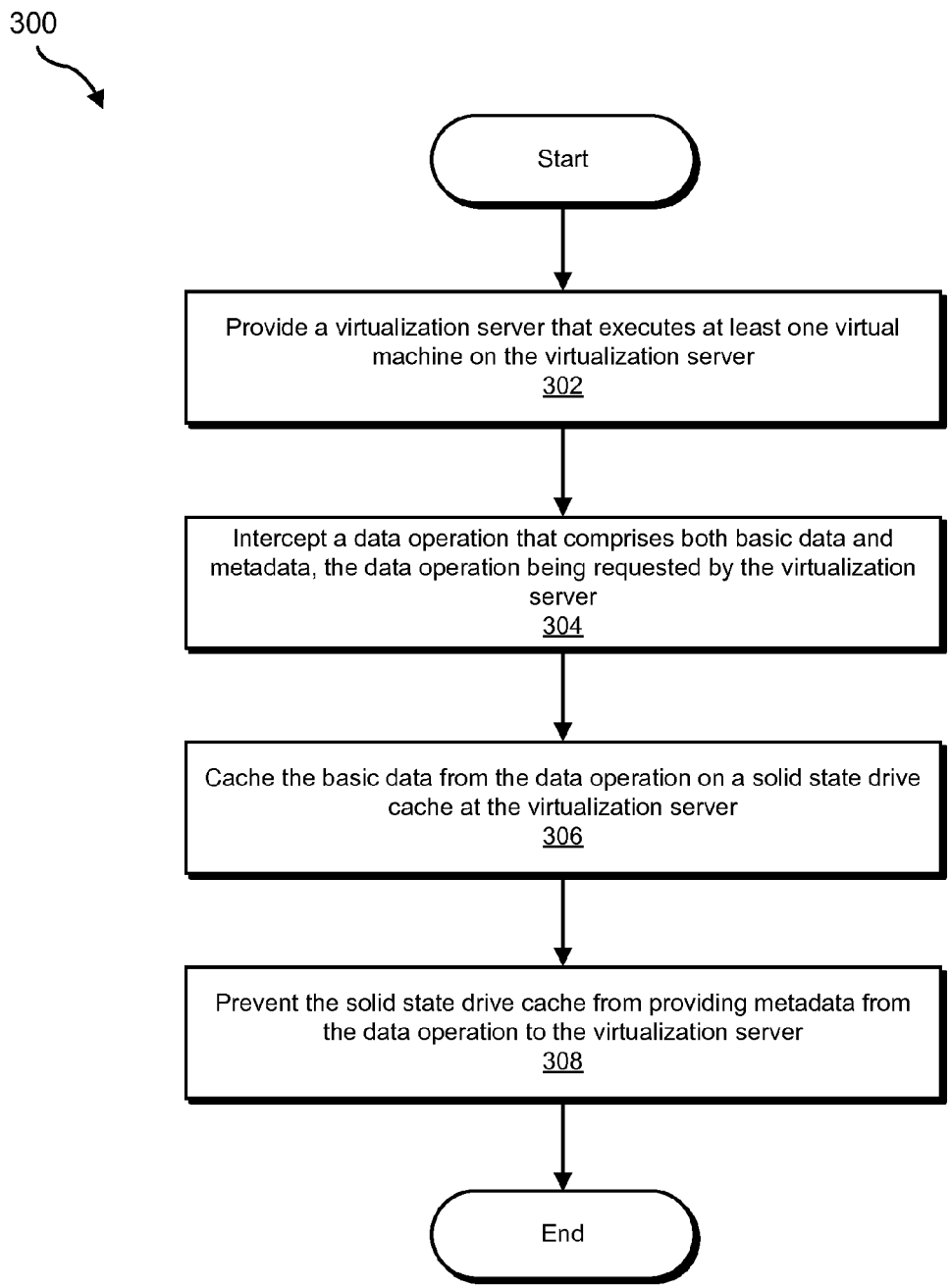
FIG. 3 is a flow diagram of an exemplary method for caching data on virtualization servers.

FIG. 3 is a flow diagram of an exemplary computer-implemented method 300 for caching data on virtualization servers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

At step 302, one or more of the systems described herein may provide a virtualization server that executes at least one virtual machine on the virtualization server. For example, provisioning module 104 may provide a virtualization server that executes at least one virtual machine on the virtualization server.

Provisioning module 104 may provide the virtualization server in a variety of manners. For example, provisioning module 104 may provide the virtualization server by installing the virtualization server. Provisioning module 104 may also provide the virtualization server by authenticating the virtualization server. Provisioning module 104 may further provide the virtualization server by recognizing a network connection to the virtualization server. Provisioning module 104 may also provide the virtualization server by requesting access to the virtualization server.

The virtualization server may correspond to each of computing devices 202 (A) and (B) in FIG. 2. Each of these computing devices may include a physical host in a cluster virtualization system. Each physical host may host one or more virtual machines. The virtualization system (e.g. system 200) may also migrate a virtual machine from one physical host to another physical host. As used herein, the term virtual machine may refer to a software construct that represents an entire computing system but is isolated from underlying hardware such that the hardware may execute different or multiple virtual machines.

At step 304, one or more of the systems described herein may intercept a data operation that includes both basic data and metadata, the data operation being requested by the virtualization server. For example, interception module 106 may intercept a data operation that includes both basic data and metadata. As used herein, the term "a data operation" refers to at least one data operation, which may include a write, read, input, and/or output operation.

Interception module 106 may intercept the data operation in a variety of manners. For example, interception module 106 may intercept the data operation using a dynamic multipathing module in a virtualization system that contains the virtualization server. The dynamic multipathing module may intercept the data operation at a dynamic multipathing stage of the virtualization system that dynamically routes the data operation to a target destination. In general, dynamic multipathing may refer to the selection of one from different paths between a source and a destination. The dynamic multipathing module may select the path based on host failover, host connectivity, path speed or length, load balancing, and/or any other suitable factor.

Figure 4:
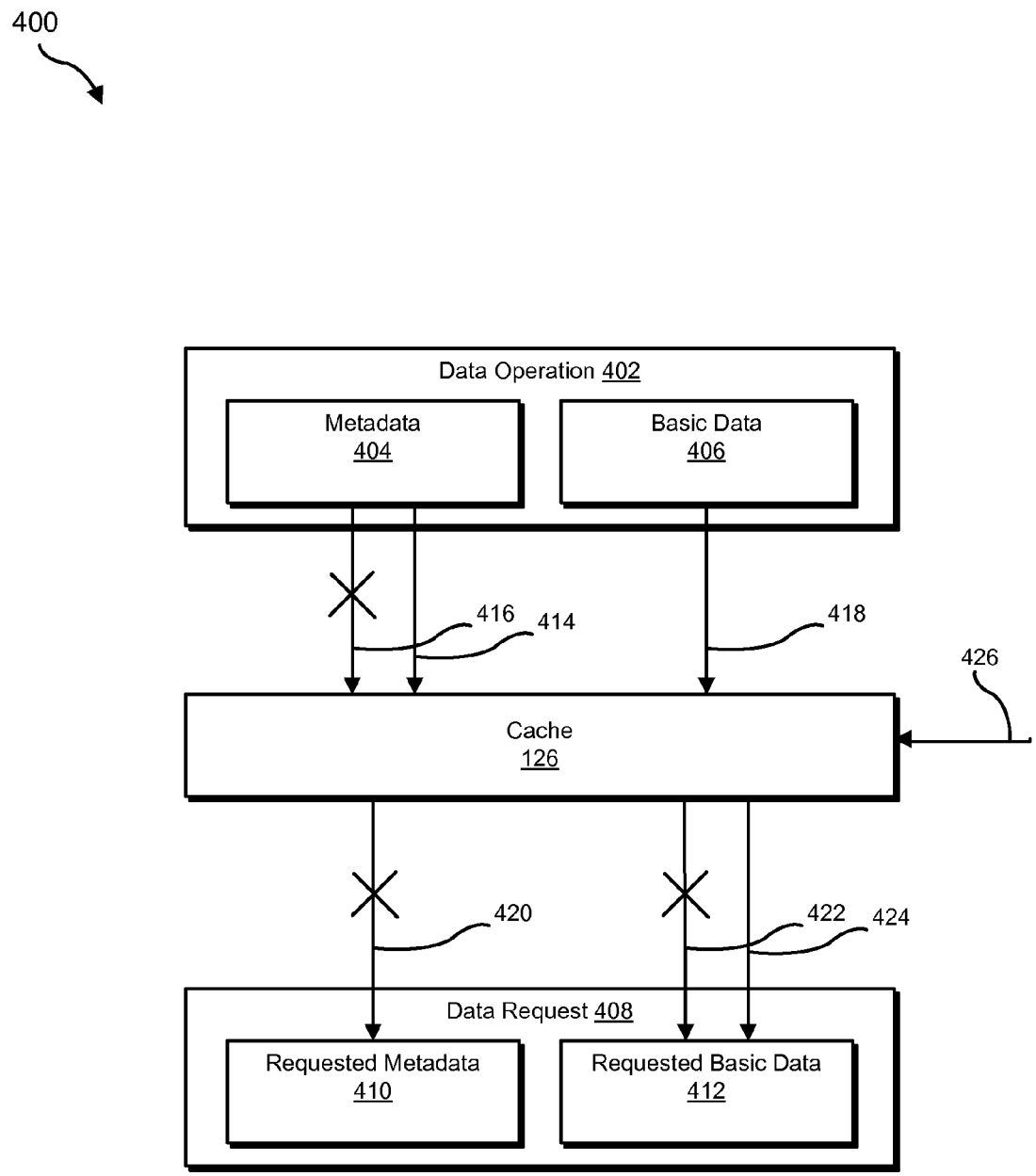
FIG. 4 is a block diagram that illustrates the preventing of a solid state drive cache from providing metadata.

FIG. 4 is a block diagram of solid state drive cache 126 that illustrates how interception module 106 may intercept the data operation. As shown in FIG. 4, a virtualization server may instruct a data operation 402. Data operation 402 may include both metadata 404 and basic data 406. As used herein, metadata and basic data are distinct in that metadata is data that labels or annotates underlying basic data. Exemplary metadata includes packet headers and virtual machine file system tags. Exemplary basic data includes application data and multimedia content.

Data operation 402 originally may be directed to shared metadata storage, such as metadata storage 122. For example, computing devices 202 (A) and (B) in FIG. 2 may share the same metadata storage 122. Although data operation 402 may be directed to the shared metadata storage, interception module 106 may intercept the data operation. Caching module 108 may then cache 418 the basic data at step 306 of method 300, and prevention module 110 may prevent cache 126 from providing the metadata at step 308, as described below.

At step 306, one or more of the systems described herein may cache the basic data from the data operation on a solid state drive cache at the virtualization server. For example, caching module 108 may cache the basic data from the data operation on a solid state drive cache.

Caching module 108 may cache the basic data in a variety of manners. For example, caching module 108 may cache the basic data by identifying high frequency data. High frequency data may include data that caching module 108 identifies as being requested, or written, at a higher frequency than other data intercepted by interception module 106. Caching module 108 may cache high frequency data without caching lower frequency data. Caching module 108 may also prioritize caching high frequency data over lower frequency data. Caching module 108 may use one or more caching algorithms, such as algorithms 124, to cache the basic data.

At step 308, one or more of the systems described herein may prevent the solid state drive cache from providing metadata from the data operation to the virtualization server. For example, prevention module 110 may prevent the solid state drive cache from providing metadata from the data operation to the virtualization server.

Prevention module 110 may prevent the solid state drive cache from providing metadata from the data operation in a variety of manners. For example, prevention module 110 may prevent the solid state drive cache from providing metadata at least in part by filtering metadata from the data operation such that only basic data is cached on the solid state drive cache. As shown in FIG. 4, prevention module 110 may filter 416 the metadata 404 from data operation 402, while permitting basic data 406 to be cached on cache 126.

Prevention module 110 may also prevent the solid state drive cache from providing metadata at least in part by caching the metadata on the solid state drive cache, and invalidating at least a part of the solid state drive cache in response to caching the metadata. As shown in FIG. 4, prevention module 110, in cooperation with caching module 108, may cache 414 the metadata 404 as well as cache 418 basic data 406. In that case, prevention module 110 would still prevent 420 cache 126 from providing the metadata by invalidating at least a part of cache 126. Prevention module 110 may invalidate part of cache 126 by providing an invalidation or flush signal 426.

Prevention module 110 may invalidate the part of the cache by invalidating the entire solid state drive cache. In that case, prevention module 110 may prevent 420 cache 126 from providing requested metadata 410 as well as prevent 422 the cache from providing requested basic data 412. Prevention module 110 may also invalidate the part of the cache by invalidating a part of the solid state drive cache that contains the metadata without invalidating a part of the solid state drive cache that contains the basic data. In that case, prevention module 110 may still permit 424 cache 126 to provide the requested basic data 412.

Prevention module 110 may prevent the solid state drive cache from providing metadata in part by determining whether an operation to filter metadata from the data operation is available. Prevention module 110 may filter metadata from the data operation in response to determining that an operation to filter metadata is available. Prevention module 110 may invalidate at least part of the solid state drive cache in response to determining that an operation to filter metadata is not available. If the operation is not available, then metadata at cache 126 is not reliable and should be invalidated by prevention module 110.

Prevention module 110 may also generally invalidate at least part of the solid state drive cache based on a determination that the part of the cache stores data that is no longer reliable. Prevention module 110 may determine that either basic data or metadata is no longer reliable. Prevention module 110 may determine that the data is no longer reliable even if the data is likely to be reliable, but no longer guaranteed to be reliable. Data may become unrealiable for a variety of reasons. These reasons may include migration of a virtual machine and access of one or more virtual machines to an underlying primary storage after the data is written to the cache (i.e. such that the virtual machines may overwrite the data on the primary storage corresponding to the data on the cache).

Prevention module 110 may prevent the solid state drive cache from providing metadata in part by distinguishing between the basic data and the metadata in the data operation. Prevention module 110 may distinguish between the basic data and the metadata in the data operation by identifying data blocks that are accessed during a lock on shared metadata storage, and designating the identified data blocks as metadata.

Figure 5:
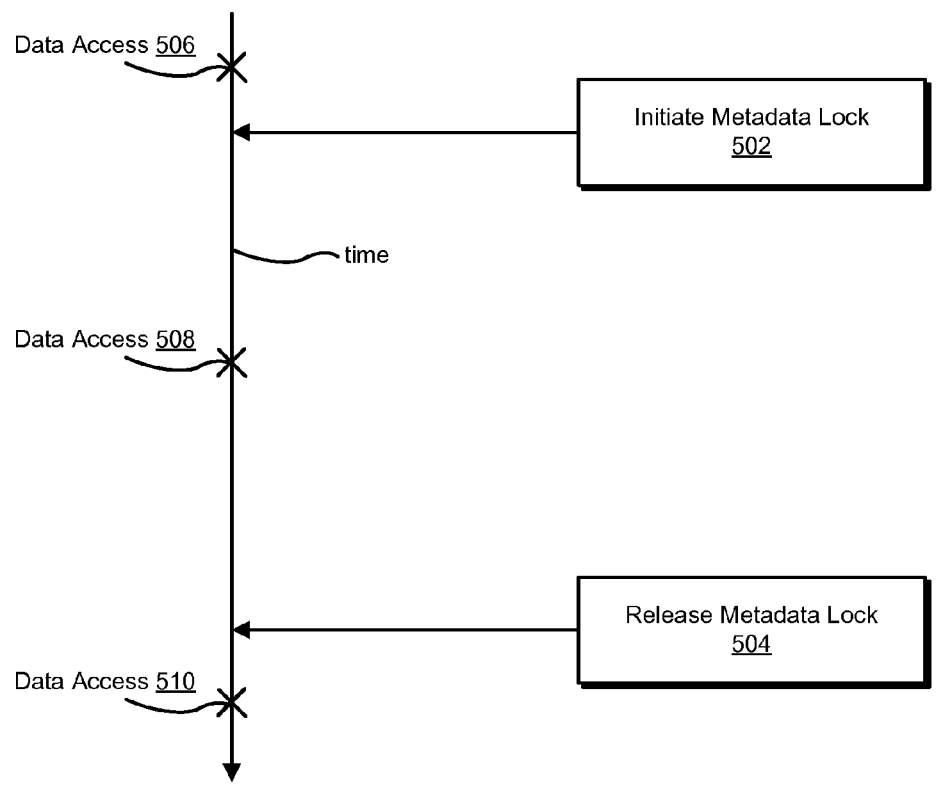
FIG. 5 is a block diagram that illustrates the locking and release of a metadata storage.

FIG. 5 is a block diagram illustrating a system 500 for the locking and releasing of a shared metadata storage, such as metadata storage 122. At point 502, a host in the virtualization system, such as computing device 202 (A), may lock the shared metadata storage 122. While locked, other hosts, such as computing device 202 (B) may be unable to access shared metadata storage 122. At point 504, the host may release the lock on the shared metadata storage. Prevention module 110 may distinguish between the basic data and the metadata in the data operation by designating data accessed during the data lock as metadata. In the example of FIG. 5, prevention module 110 would designate data accessed at data access 508 as metadata, because data access 508 occurs during the metadata storage lock. In contrast, prevention module 110 may fail to designate data accessed at data access 506 and 510 as metadata, because that data was accessed outside of the metadata storage lock.

Figure 6:
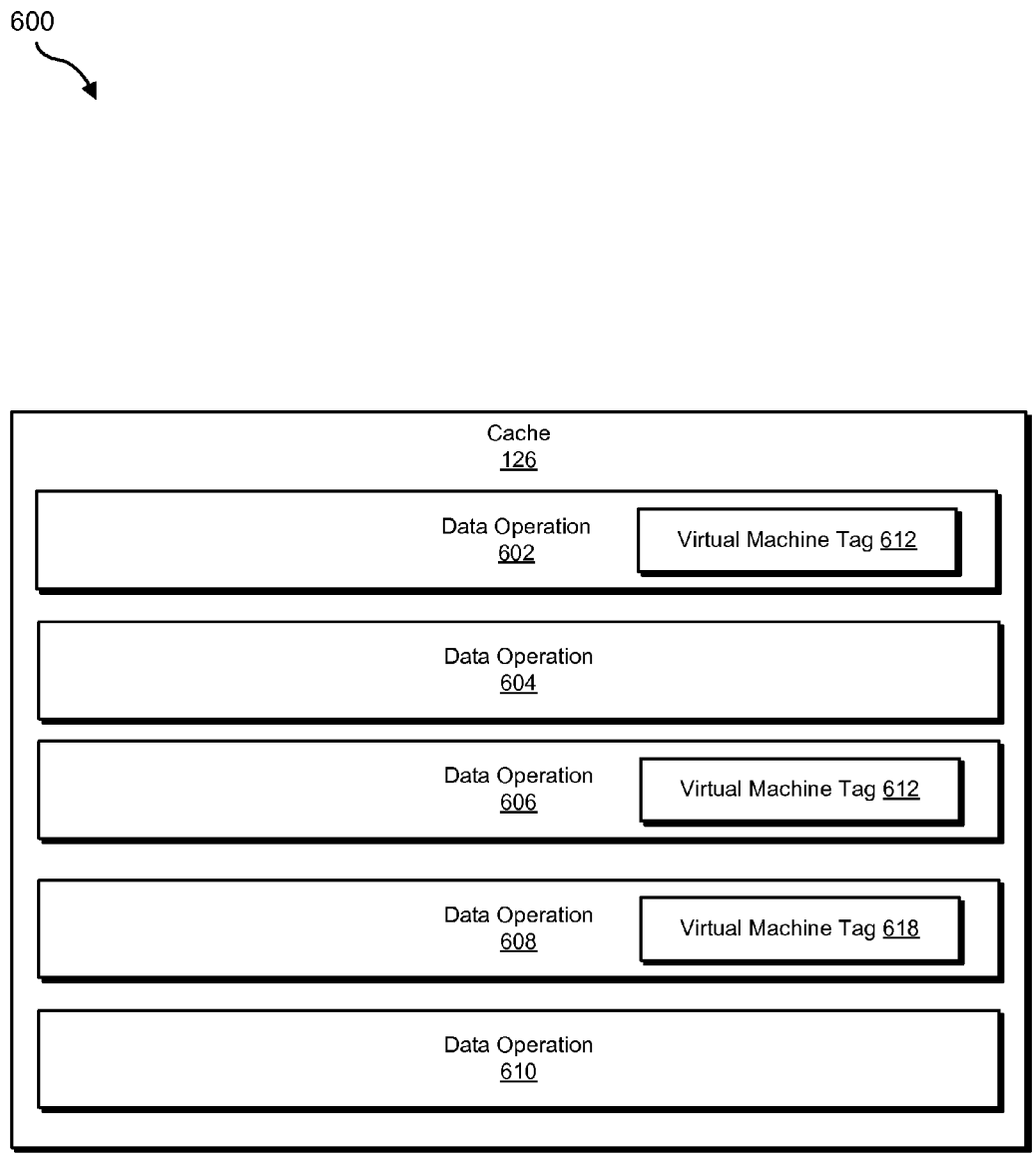
FIG. 6 is a block diagram of a solid state drive cache containing data from virtual machines.

Prevention module 110 may also distinguish between the basic data and the metadata in the data operation by identifying at least one I/O operation that is not marked with a virtual machine tag and may designate data blocks within the identified I/O operation as metadata. FIG. 6 is a block diagram illustrating a caching system 600 including solid state drive cache 126, which contains data operations 602-610. As shown in FIG. 6, data operations 602, 606, and 608 contain a respective virtual machine tag 612, 612 (the same tag for both operations 602 and 606), and 618. In contrast, data operations 604 and 610 do not contain any virtual machine tag. Accordingly, prevention module 110 may designate data blocks within data operations 604 and 610 as metadata.

Prevention module 110 may also distinguish between the basic data and the metadata in the data operation by using a mapping between basic data and metadata on an underlying primary storage. For example, the mapping may indicate which data operations, or parts of data operations, are directed to metadata and which are directed to basic data. Prevention module 110 may use the mapping to prevent the solid state drive cache from providing metadata identified by the mapping.

Prevention module 110 may also distinguish between the basic and the metadata in the data operation by receiving an external signal that identifies a data operation as being directed to basic data and/or metadata. A failure to designate a data operation as being directed to basic data may indicate that the data operation is directed to metadata, and vice versa. An application engaging the virtualization server may provide the external signal that identifies a data operation as being directed to basic data and/or metadata. The application may include an application that originates the data operation for writing and/or reading to an underlying primary storage. The application may also include a monitoring application that intercepts, monitors, and tags data operations as basic data and/or metadata.

Prevention module 110 may also prevent the solid state drive cache from providing metadata in part by identifying a request to migrate a virtual machine from the virtualization server to another virtualization server. Prevention module 110 may prevent the solid state drive cache from providing metadata by clearing the entire solid state drive cache in response to the attempt to migrate the virtual machine. In the example of FIG. 6, prevention module 110 would clear the entire cache 126 including each of data operations 602-610.

Prevention module 110 may also, in response to the attempt to migrate the virtual machine, identify data blocks on the solid state drive cache belonging to the virtual machine. Prevention module 110 may then clear only the identified data blocks belonging to the virtual machine without clearing other data blocks on the solid state drive cache that belong to another virtual machine. In the example of FIG. 6, prevention module may identify a request to attempt to migrate a virtual machine corresponding to virtual machine tag 612. In that case, prevention module 110 may clear data operations 602 and 606 in cache 126, because they have virtual machine tag 612, while failing to clear the remaining data operations in cache 126.

In response to identifying the request to attempt to migrate the virtual machine, prevention module 110 may also determine whether the virtualization server was configured to perform write-back caching or write-through caching. Write-back caching may return success of a data operation after performing the data operation on the solid state device cache first and then only perform the data operation on a shared metadata storage after a delay. Write-through caching may return success of a data operation after performing the data operation in parallel on both the solid state drive cache and a primary storage device. Prevention module 110 may determine that the virtualization server was configured to perform write-back caching. Prevention module 110 may further perform, in response to the attempt to migrate the virtual machine, at least one pending data operation that is cached on the solid state drive cache on the shared metadata storage. Prevention module 110 may further clear the solid state drive cache only after performing the pending data operation on the metadata storage.

As explained above, the systems and methods described herein may enable virtualization servers to cache data without creating conflicts over shared metadata storage. By implementing a solid state drive cache, system and methods presented herein can reduce input/output operations over the storage network. Reducing input/output operations may enable more virtual machines to be executed on the same host.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the provisioning, intercepting, caching, preventing, filtering, invalidating, determining, distinguishing, identifying, designating, attempting, migrating, performing, and clearing steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the provisioning, intercepting, caching, preventing, filtering, invalidating, determining, distinguishing, identifying, designating, attempting, migrating, performing, and clearing steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for caching data on virtualization servers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a data operation to be transformed, transform the data operation by filtering out metadata, and store a result of the transformation to a solid state drive cache. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for caching data on virtualization servers, at least a portion of the method being performed by a computing device comprising at least one processor, the method comprising:
    providing a virtualization server that executes at least one virtual machine on the virtualization server;
    intercepting, by a dynamic multipathing module, at least one data operation that:
        comprises at least one cluster virtualization system read and/or write operation;
        comprises both basic data and virtual machine file system metadata that maps the basic data to a target virtual machine;
        is directed to a storage shared with other virtualization servers of a cluster virtualization system;
    caching the basic data from the data operation on a solid state drive cache at the virtualization server;
    preventing the solid state drive cache at the virtualization server from providing the virtual machine file system metadata from the data operation to the virtualization server by filtering the virtual machine file system metadata from the data operation to prevent the virtual machine file system metadata from being cached on the solid state drive cache such that only the basic data is cached on the solid state drive cache.

2. The computer-implemented method of claim 1, wherein caching the basic data comprises identifying the basic data as high frequency data.

3. The computer-implemented method of claim 1, further comprising determining whether an operation to filter the virtual machine file system metadata from the data operation is available.

4. The computer-implemented method of claim 1, wherein the dynamic multipathing module selects one of different paths between a source and the storage shared with other virtualization servers of the cluster virtualization system.

5. The computer-implemented method of claim 1, wherein caching the basic data is performed according to a caching algorithm.

6. The computer-implemented method of claim 3, further comprising
    filtering the virtual machine file system metadata from the data operation in response to determining that an operation to filter the virtual machine file system metadata is available.

7. The computer-implemented method of claim 1, wherein preventing the solid state drive cache from providing the virtual machine file system metadata comprises distinguishing between the basic data and the virtual machine file system metadata in the at least one data operation.

8. The computer-implemented method of claim 7, wherein distinguishing between the basic data and the metadata in the at least one data operation is performed using a mapping between basic data and metadata that indicates which data operations are directed to metadata and which are directed to basic data.

9. The computer-implemented method of claim 7, wherein distinguishing between the basic data and the virtual machine file system metadata in the at least one data operation comprises:
    identifying data blocks that are accessed during a lock on the shared storage;
    designating the identified data blocks as virtual machine file system metadata rather than basic data.

10. The computer-implemented method of claim 7, wherein distinguishing between the basic data and the virtual machine file system metadata in the at least one data operation comprises:
    identifying at least one I/O operation that is not marked with a virtual machine tag;

designating data blocks within the identified I/O operation as virtual machine file system metadata.

11. A system for caching data on virtualization servers, the system comprising:
- a provisioning module programmed to provide a virtualization server that executes at least one virtual machine on the virtualization server;
- an interception module programmed to intercept, at a dynamic multipathing stage, at least one data operation that:
  - comprises at least one cluster virtualization system read and/or write operation;
  - comprises both basic data and virtual machine file system metadata that maps the basic data to a target virtual machine;
  - is directed to a storage shared with other virtualization servers of cluster virtualization system;
- a caching module programmed to cache the basic data from the data operation on a solid state drive cache at the virtualization server;
- a prevention module programmed to prevent the solid state drive cache at the virtualization server from providing the virtual machine file system metadata from the data operation to the virtualization server by filtering the virtual machine file system metadata from the data operation to prevent the virtual machine file system metadata from being cached on the solid state drive cache such that only the basic data is cached on the solid state drive cache;
- at least one processor configured to execute the provisioning module, the interception module, the caching module, and the prevention module.

12. The system of claim 11, wherein the prevention module is further programmed to identify an attempt to migrate the virtual machine from the virtualization server to another virtualization server within the cluster virtualization system.

13. The system of claim 12, wherein the prevention module is further programmed to determine whether the virtualization server was configured to perform write-back caching or write-through caching, wherein:
- write-back caching returns success of a data operation after performing the data operation on the solid state drive cache first and then only performs the data operation on the shared storage after a delay,
- write-through caching returns success of a data operation after performing the data operation in parallel on both the solid state drive cache and a primary storage device.

14. The system of claim 13, wherein the prevention module is further programmed to determine that the virtualization server was configured to perform write-back caching.

15. The system of claim 14, wherein the prevention module is further programmed to perform, in response to the attempt to migrate the virtual machine, at least one pending data operation that is cached on the solid state drive cache on the shared storage.

16. The system of claim 15, wherein the prevention module is further programmed to clear the solid state drive cache only after performing the pending data operation on the shared storage.

17. The system of claim 12, wherein the prevention module is further programmed to clear the entire solid state drive cache in response to the attempt to migrate the virtual machine.

18. The system of claim 12, wherein the prevention module is further programmed to:
- identify data blocks on the solid state drive cache belonging to the virtual machine;
- clear only the identified data blocks belonging to the virtual machine without clearing other data blocks on the solid state drive cache that belong to another virtual machine.

19. The system of claim 11, wherein the prevention module intercepts the data operation using a dynamic multipathing module in the cluster virtualization system.

20. A non-transitory computer-readable medium comprising one or more computer-executable instructions that, when executed by at least one processor of a computing device, cause the computing device to:
- provide a virtualization server that executes at least one virtual machine on the virtualization server;
- intercept, by a dynamic multipathing module, at least one data operation that:
  - comprises at least one cluster virtualization system read and/or write operation;
  - comprises both basic data and virtual machine file system metadata that maps the basic data to a target virtual machine;
  - is directed to a storage shared with other virtualization servers of a cluster virtualization system;
- cache the basic data from the data operation on a solid state drive cache at the virtualization server;
- prevent the solid state drive cache at the virtualization server from providing the virtual machine file system metadata from the data operation to the virtualization server by one-off filtering the virtual machine file system metadata from the data operation to prevent the virtual machine file system metadata from being cached on the solid state drive cache such that only the basic data is cached on the solid state drive cache.

* * * * *

UNITED STATES PATENT AND TRADEMARK OFFICE
CERTIFICATE OF CORRECTION

PATENT NO.       : 9,524,190 B1
APPLICATION NO.  : 13/607434
DATED            : December 20, 2016
INVENTOR(S)      : Niranjan Pendharkar It is certified that error appears in the above-identified patent and that said Letters Patent is hereby corrected as shown below:

In the Claims

Claim 11, Column 17, Lines 16-17, should read:
is directed to a storage shared with other virtualization servers of a cluster virtualization system;

Claim 20, Column 18, Line 45, should read:
server by filtering the virtual machine file Signed and Sealed this
Twenty-eighth Day of February, 2017

Michelle K. Lee
*Director of the United States Patent and Trademark Office*